United States Patent
Crosby et al.

(10) Patent No.: US 7,149,985 B1
(45) Date of Patent: Dec. 12, 2006

(54) SYSTEM AND METHOD FOR NAVIGATING WITHIN A DISPLAY HAVING DIFFERENT DISPLAY SECTIONS

(75) Inventors: Sheila Renee Crosby, Crystal Lake, IL (US); Steven Todd Barlow, Raleigh, NC (US); Robert John Strong, Arlington Heights, IL (US)

(73) Assignee: Thomson Licensing, Boulogne-Billancourt (FR)

( * ) Notice: Subject to any disclaimer, the term of this patent is extended or adjusted under 35 U.S.C. 154(b) by 386 days.

(21) Appl. No.: 09/486,545

(22) PCT Filed: Aug. 25, 1998

(86) PCT No.: PCT/US98/17570

§ 371 (c)(1),
(2), (4) Date: Sep. 1, 2000

(87) PCT Pub. No.: WO99/10798

PCT Pub. Date: Mar. 4, 1999

(51) Int. Cl.
*G06F 3/00* (2006.01)

(52) U.S. Cl. ...................... 715/851; 715/854
(58) Field of Classification Search ........... 345/700, 345/712, 737–739, 742, 764, 781, 817–829, 345/160, 357, 835, 839, 853–855, 767, 768, 345/859, 860, 837, 861; 348/731; 715/850, 715/851, 853, 854
See application file for complete search history.

(56) References Cited

U.S. PATENT DOCUMENTS

| | | | | |
|---|---|---|---|---|
| 5,539,479 A | * | 7/1996 | Bertram | 345/158 |
| 5,594,509 A | * | 1/1997 | Florin et al. | 348/565 |
| 5,812,123 A | * | 9/1998 | Rowe et al. | 345/823 |
| 5,835,692 A | * | 11/1998 | Cragun et al. | 345/419 |
| 5,918,237 A | * | 6/1999 | Montalbano | 715/513 |
| 5,958,012 A | * | 9/1999 | Battat et al. | 345/969 |
| 6,011,546 A | * | 1/2000 | Bertram | 345/700 |
| 6,112,201 A | * | 8/2000 | Wical | 345/33 |

FOREIGN PATENT DOCUMENTS

| | | |
|---|---|---|
| EP | 0626635 | 4/1994 |
| EP | 0773495 | 5/1997 |
| WO | 94/12927 | 6/1994 |
| WO | 95/01058 | 1/1995 |

OTHER PUBLICATIONS

Yoneda et al., A New Communication Tool: Time Dependent Multimedia Document, 1992, IEEE, pp. 90-97.*

* cited by examiner

*Primary Examiner*—Weilun Lo
*Assistant Examiner*—Truc T. Chuong
(74) *Attorney, Agent, or Firm*—Joseph J. Laks; Robert D. Shedd; Brian J. Cromarty (57) ABSTRACT

A system and a method for navigating within a display having one or more display sections are disclosed. A section from the one or more display sections is selected. In response to the selection, a navigational symbol is displayed on a border of the selected section, the symbol corresponding to a direction in which a highlight may be moved. In one embodiment, the highlight is moved in the corresponding direction in response to the selection of the symbol. In another embodiment, the symbol indicates an availability of an adjacent section in the corresponding direction.

10 Claims, 9 Drawing Sheets

SYSTEM AND METHOD FOR NAVIGATING WITHIN A DISPLAY HAVING DIFFERENT DISPLAY SECTIONS

FIELD OF INVENTION

The present invention relates to a system and method of providing a user interface for allowing a computer user to navigate through a plurality of electronic information sources, and in particular to a user interface for navigating through information sources in an electronic on-line environment, such as the Internet, using a display comprising a plurality of separate sections.

BACKGROUND

User interface for allowing a user to navigate through electronic information sources and on-line services are known in the art, i.e. web browsers for navigating through the Internet. In such a user interface, a user typically manipulates the position of a cursor on a display screen and selects icons or symbols displayed thereon to manipulate the displayed data or link to another information source, or web page.

To provide additional flexibility and ease for the user, a user interface may divide a single display into a plurality of independent frames wherein each frame is associated with a different information source. For Internet applications, each frame may be associated with a different data source. As such, a user may change the contents of a particular frame and link to other data sources from that frame independently of the other frames. Similarly, each section of a display or screen may correspond to a different web page, displaying different information from different web sites.

From a user interface perspective, the use of sections, for example, frames can be problematic. The user must be able to move the cursor from frame to frame. However, there is no embedded control allowing the cursor to jump from frame to frame. This is not an issue when a mouse trackball or other similar devices are used, as such devices allow the user to move the cursor freely across frame borders.

However, a problem arises when the system does not include or provide for such devices. For example, such a situation may arise in an arrangement wherein a standard television is used for browsing the Internet and the associated support system does not provide for a cursor which can move freely across the display screen. In that case, the user must use direction arrows and a selection button, or other similar devices, on a remote control device in order to select icons or symbols in a frame and move from frame to frame.

One solution to this problem is to provide a keyboard wherein a particular keystroke combination moves the cursor between frames, i.e. CTRL+arrow key. However, this requires the user to either memorize a number of keystroke combinations, which the user may find difficult to remember, or keep referring to instruction notes during operation. Further, this solution cannot be used if the user must rely entirely on a remote control device.

Another solution is to force the user to scroll through an entire frame, i.e. to the top or bottom edges of the frame, in order to move to the next frame. However, from a user's point of view, having to scroll through an entire frame can quickly become tedious and unacceptable. In addition, the contents of a frame may be lengthy and the user may run out of patience from reaching the end of the frame.

In another example, EP-A-0773-495, discloses a known user interface system having a display with one or more display sections. In particular, one of the display sections has a navigational symbol on a border of the display section. However, the symbol is merely used to scroll the content of the window up and down and not for other navigational purposes.

SUMMARY OF INVENTION

Therefore, what is needed is a user interface which allows a user to quickly and easily navigate within and between a plurality of sections on a single display screen, using a remote control device.

The present invention involves a user interface that allows a user to quickly and easily navigate within and between a plurality of sections or frames on a single display screen. In one embodiment, a user selects a highlighted icon and/or button to manipulate the data in a particular frame or one of a plurality of control arrows shown on the borders between the frames to move from one frame to another. A user controls the position of the highlight by pressing one of a plurality of direction buttons on a remote control device and selects an icon or a control arrow by pressing a selection button on the remote control device.

Therefore, a system and a method for navigating within a display having one or more display sections are disclosed, the system comprising:
  means for selecting a section of said display; and
  control means, in response to said selection, for displaying a navigational symbol on a border of said selected section, said symbol corresponding to a direction in which a highlight may be moved.

In one embodiment of the invention, the control means, in response to a selection of said symbol on said border, moves said highlight in said corresponding direction. In another embodiment, said symbol indicates an availability of an adjacent section in said corresponding direction.

The present invention may advantageously be used in arrangements wherein a standard home television is connected to the Internet using appropriate support equipment but the system does not include or provide for a cursor which can freely move across the frames on the display screen.

BRIEF DESCRIPTION OF DRAWINGS

The invention will be described with reference to the accompanying drawings, wherein.

DETAILED DESCRIPTION OF DRAWINGS

Referring to FIGS. 1A–1C, and FIG. 2, there are shown representations of display screen 10 divided into a plurality of sections or frames 15, 16, 17, 18, 19 and 20. Such a display is suitable for presenting information from a plurality of different information sources at one time. In Internet applications, each frame may be associated with different information and may be manipulated independently of the other frames. This type of display may be provided on a computer monitor or a standard television monitor using appropriate support equipment and software, including, but not limited to the N/C 100 system provided by Thomson Consumer Electronics, Inc. of Indianapolis, Ind.

Figure 3:
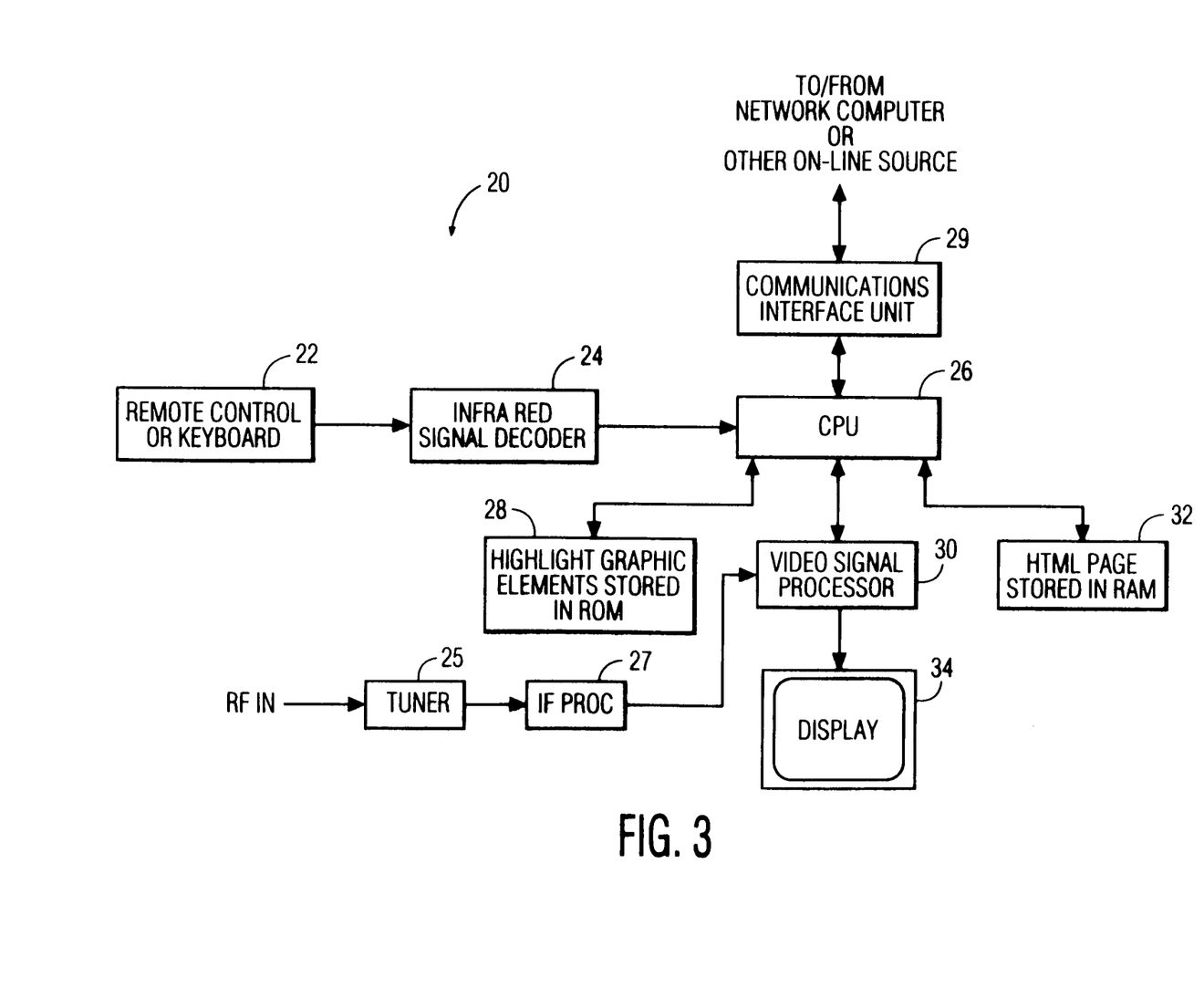
FIG. 3 is a simplified block diagram of an apparatus for implementing the present user interface.

A simplified block diagram of a suitable apparatus for providing a display in accordance with the present invention is shown in FIG. 3. Apparatus for electronically connecting a display terminal to various electronic information sources are known in the art and will not be discussed in detail here. As shown in FIG. 3, the suitable apparatus 20 comprises a controller, CPU 26, which receives the commands from a user and performs the steps necessary to provide a display on television or computer display 34, as shown in FIGS. 4–8, to be discussed below. Typically, user input is provided through a user entry device such as a remote control or keyboard 22 which sends a signal to IR signal decoder 24 operatively connected to CPU 26. CPU 26 is also connected to a network computer or other on line data sources through communications interface unit 29 to send and receive data therethrough. CPU 26 also accesses ROM 28 which stores the data for generating the display and highlighting graphic elements and RAM 32 which stores HTML page data received through interface unit 29. Upon receiving a user command, CPU 26 accesses the data in ROM 28 and RAM 32, and provides an output to video signal processor 30 which generates signals to control display 34. In a system which uses a standard television monitor, tuner 25 and IF processor 27 are also connected to video signal processor 30 to provide a baseband video signal representing the video portion of a tuned television signal.

Figure 1A:
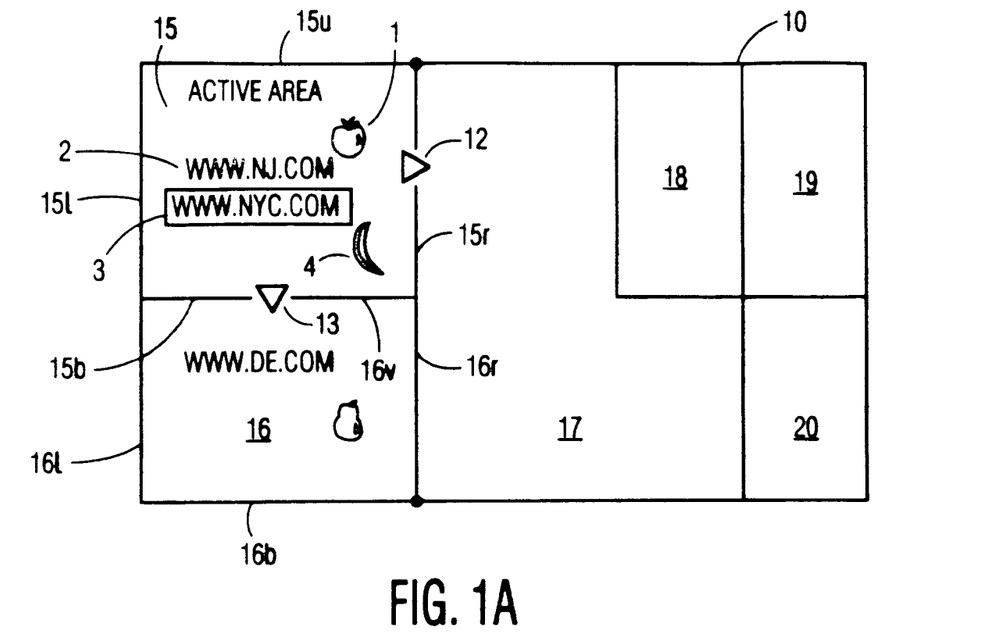
FIGS. 1A–1C are representations of a display screen having a plurality of sections, with a first section as being active.

In the present arrangement wherein a remote control device 22 is used to select the icons or the symbols on the display, highlighting methods are used to indicate to the user which icon or symbol is currently available for selection. An icon or a symbol may be highlighted by changing the appearance of the icon or the symbol, for example by changing the size and/or color of the icon or symbol. In our exemplary embodiment, as shown in FIG. 1A, for example, an icon 3 is shown as being highlighted by having a background box surrounding it. The highlighting may be thought of as a background cursor which can only move to certain locations on the display and changes the appearance of the icon or symbol over which it is placed.

Upon highlighting the desired icon or symbol, the user can select the highlighted icon or symbol using the appropriate select button on the remote control device in order to change the display in some manner. Thus, the present invention allows a user to easily and quickly navigate within and between the various frames by moving the position of a highlight and selecting the highlighted icon or symbol using a remote control device.

Figure 9:
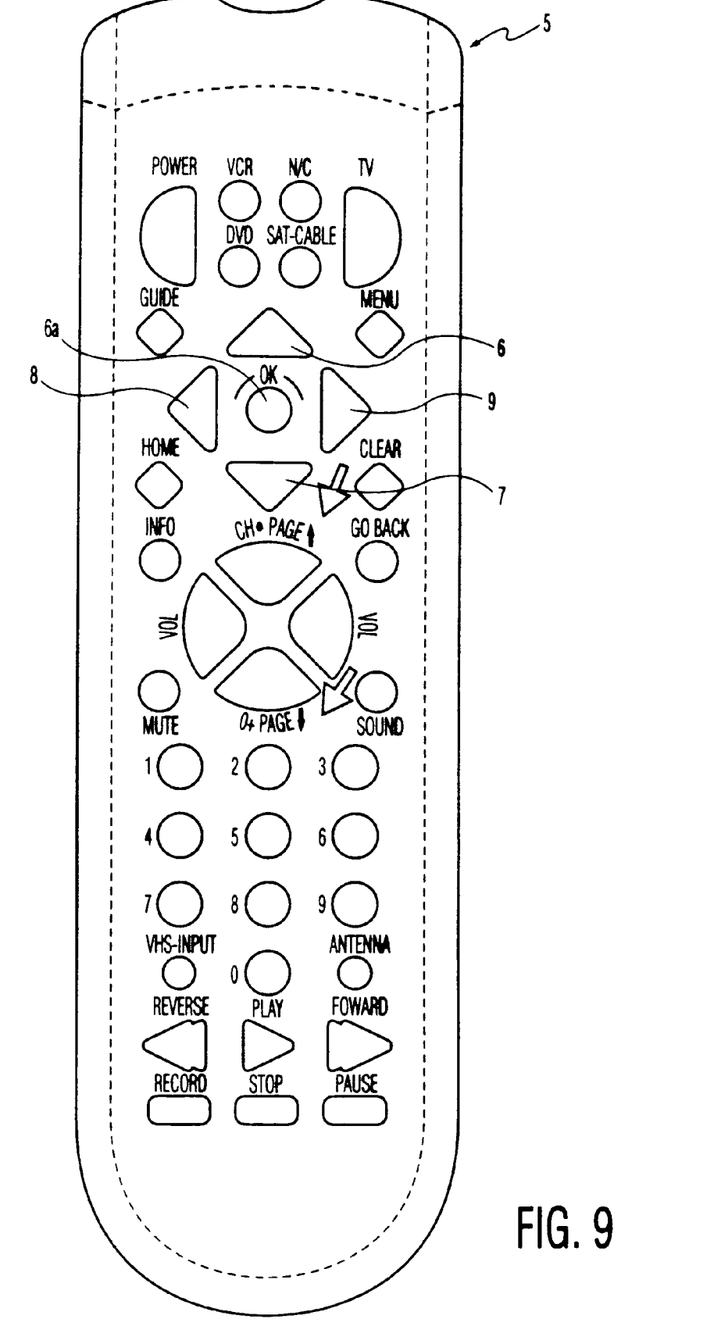
FIG. 9 is a top plan view of a remote control device suitable for use with the present user interface.

A suitable user entry or a remote control device 5 is shown in FIG. 9. As shown in FIG. 9, remote control device 5 includes direction buttons 6, 7, 8, 9, which correspond to up, down, left and right directions, respectively, for moving the position of the highlight. For example, pressing up button 6 will cause the icon or symbol nearest and above the currently highlighted icon or symbol to become highlighted indicating that it is now available for selection. Remote control device 5 also includes OK button 6a for selecting the highlighted icon or symbol. Suitable remote control devices include, but are not limited to, CRK93H1 manufactured by Thomson Consumer Electronics, Inc. of Indianapolis, Ind. and adapted for use with the N/C 100 system. Therefore, using remote control device 5 in the manner described above, a user can easily and quickly move the highlighting within a frame and select the highlighted icons as desired thereby easily navigating within a particular frame.

Figure 1B:
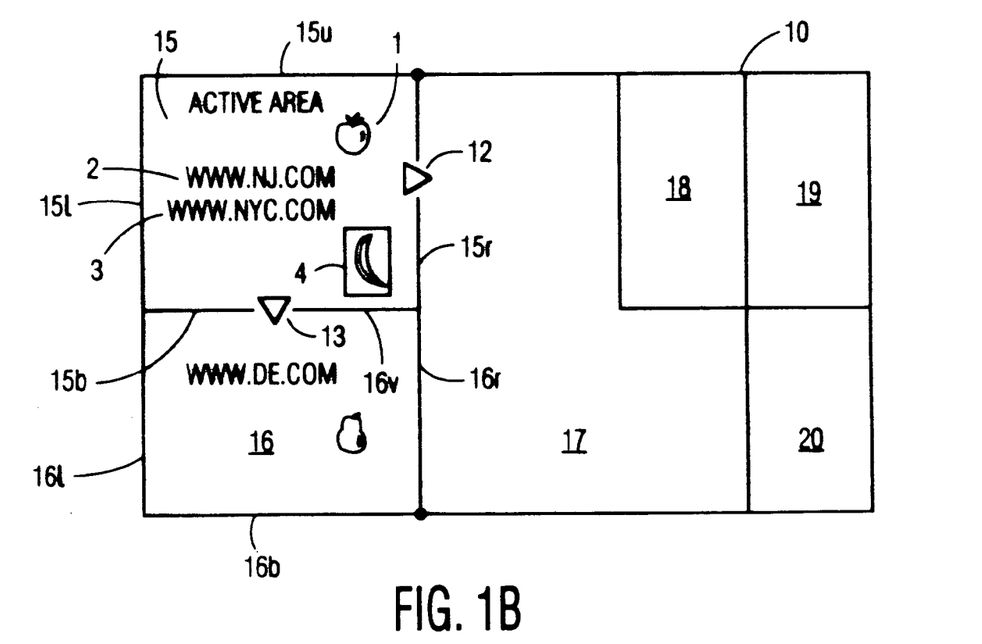

For example, as shown in FIG. 1A, an icon 3 is initially highlighted as shown by a background box surrounding the icon. An icon may be a symbol or text string which has a related HTML link or the like. Since the highlighted icon 3 is in section 15, section 15 is the active area in which a user can move from one icon to another using the direction buttons 6, 7, 8, 9 on the user entry control 5. For example, if icon 3 is currently being highlighted as shown in FIG. 1A, and a user pushes the down button 7 on the remote control, icon 4 will become highlighted as shown in FIG. 1B.

Navigation between frames is now discussed. In FIGS. 1A and 1B, frame 15 is active (i.e., selected) and the remaining frames are inactive, as discussed above. That is, the user can manipulate the information provided to frame 15 by using remote control device 5 to select the icons within frame 15. The user may select which frame is active using remote control device 5 to highlight and select navigation controls in the form of, for example, control arrow symbols 12 and 13 shown in the frame borders 15r and 15b as described further below.

In the present user interface, navigation controls are embedded into borders surrounding an active frame such that a user can navigate between the frames using arrow buttons 6–9 and "OK" button 6a on remote control device 5. For example, directional symbols 12 and 13 appear as arrows in the borders 15r and 15b between frames 15 and 17 and 15 and 16, respectively, and may be highlighted and selected in the same manner as the icons. In other words, the highlight is moved between the icons and the arrows using direction buttons 6–9 and the icons and arrows may be selected using OK button 6a.

Figure 2:
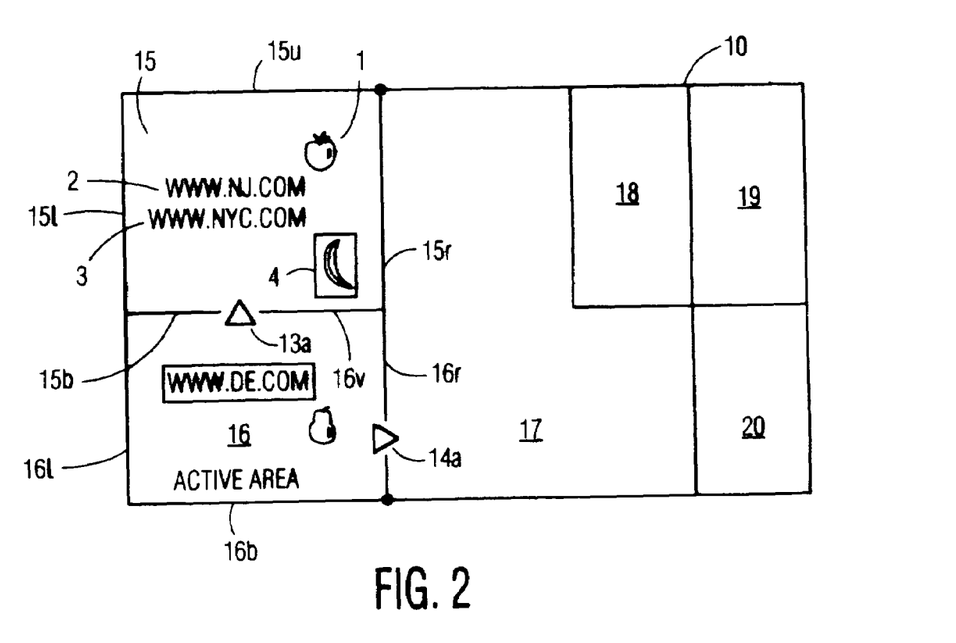
FIG. 2 shows a display screen having a second area as being active.

Highlighting and selecting a control arrow (e.g., 12 or 13) on the border will also cause the user interface to scroll the contents of the frame in the direction of the arrow. However, if the control arrow is selected after the frame contents have reached the edge of the respective border in the direction of the arrow, the user interface will switch the highlight to the nearest icon or symbol inside the next frame to which the arrow is pointing. In this manner, the adjacent frame becomes active. For example, in FIG. 1A, when arrow 12 is highlighted after the contents of frame 15 have been scrolled to the rightmost edge and the user presses OK button 6a, frame 17 becomes active and frame 15 becomes inactive. Similarly, when arrow 13 is highlighted after the contents of frame 15 have been scrolled to the bottom edge and OK button 6a is pressed, frame 16 becomes active and frame 15 becomes inactive as shown in FIG. 2. Once a new frame 16 becomes active, arrows 13a and 14a appear on the borders around the newly activated frame 16 to allow the user to select and activate frames adjacent the newly activated frame 16 as desired.

Figure 4:
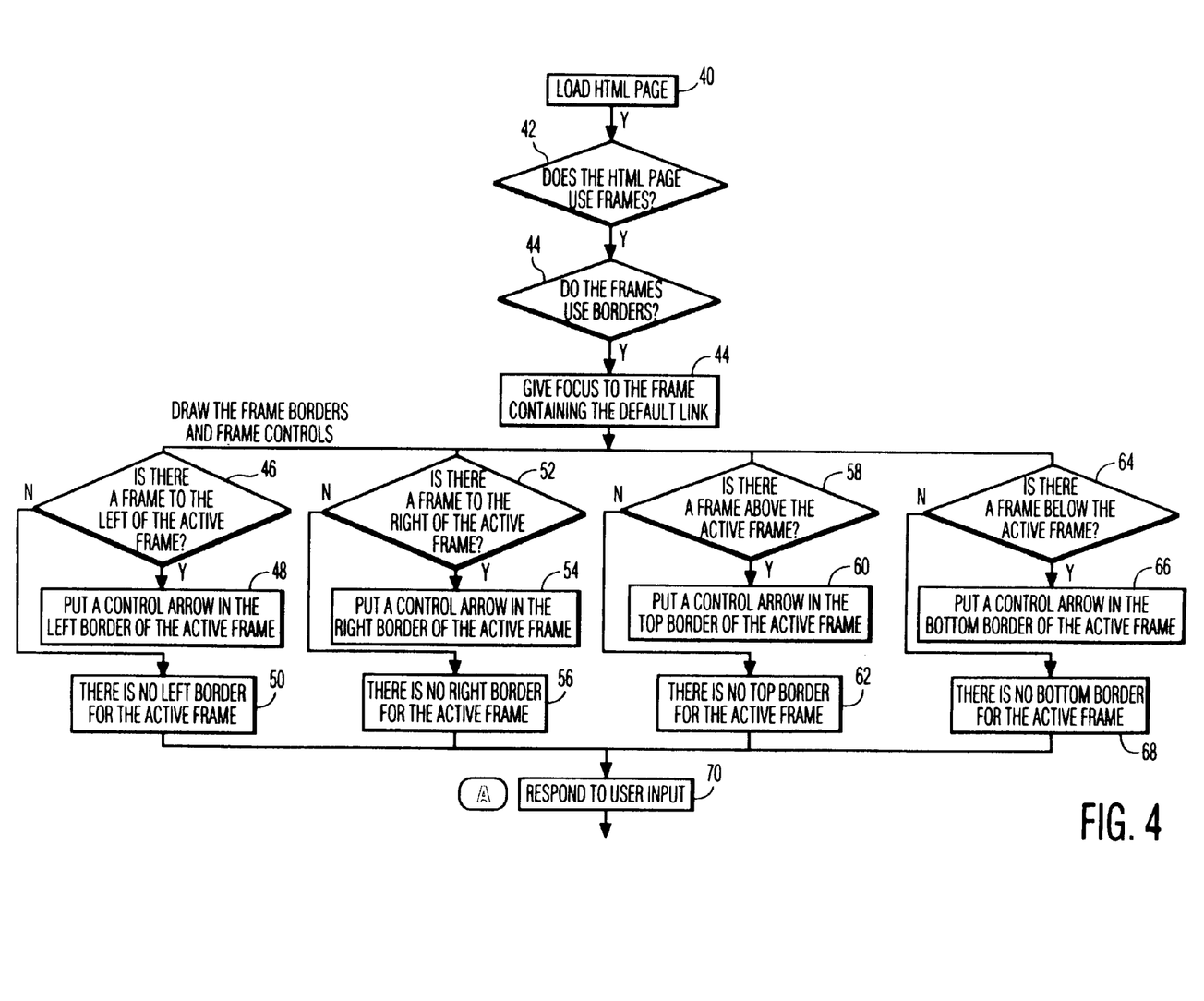
FIGS. 4–8 are flow chart diagrams showing the steps taken by the present user interface.
Figure 5:
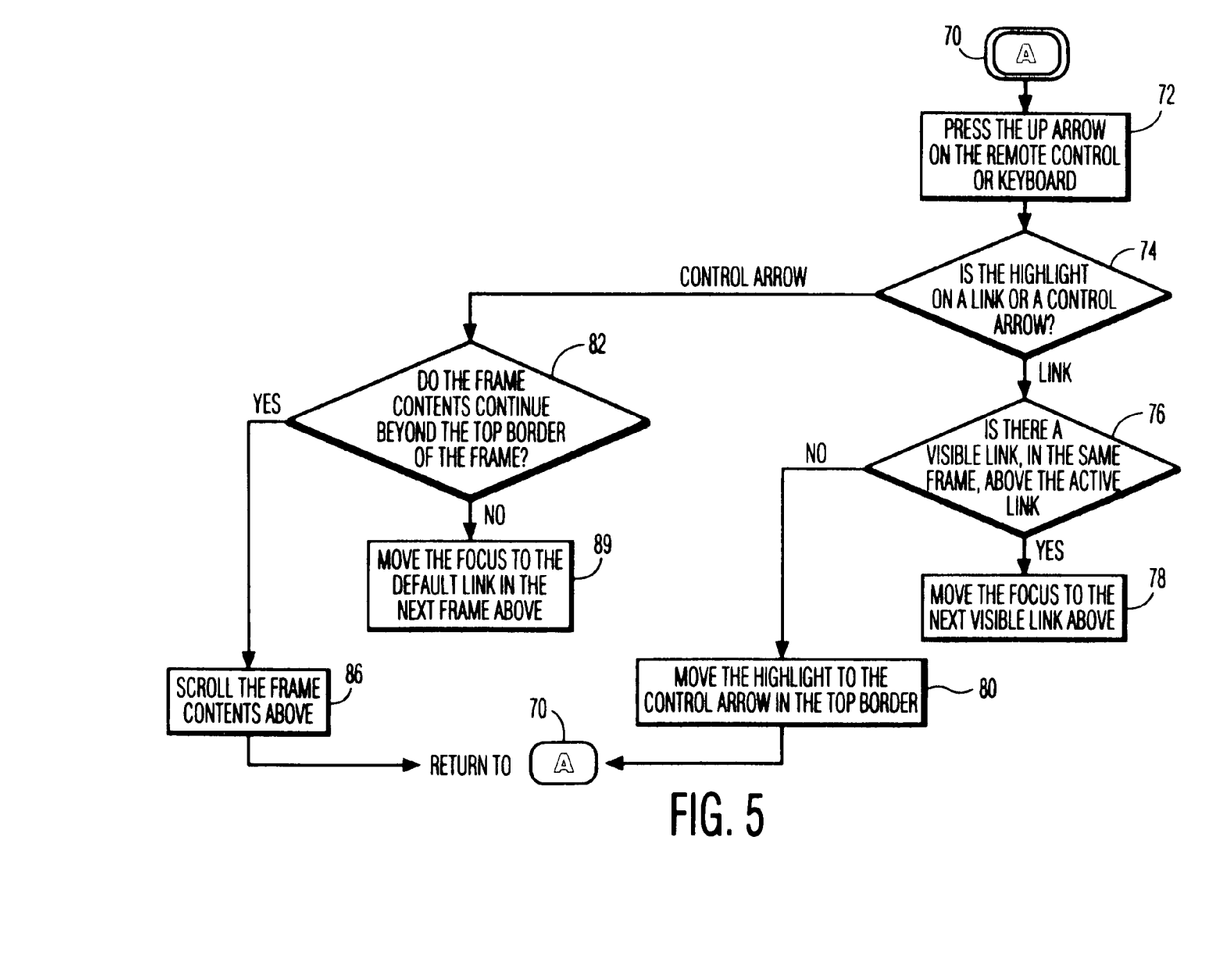
Figure 6:
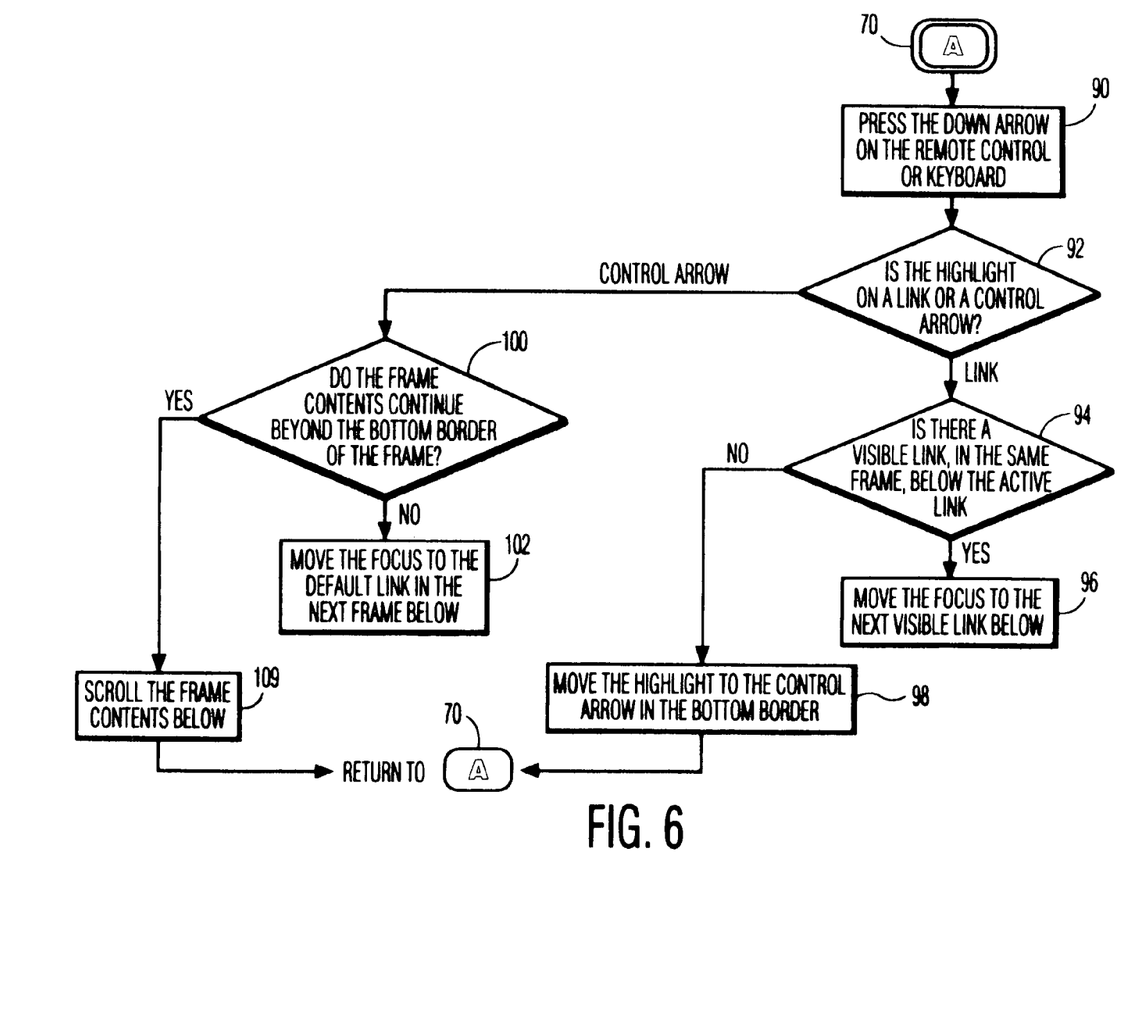
Figure 7:
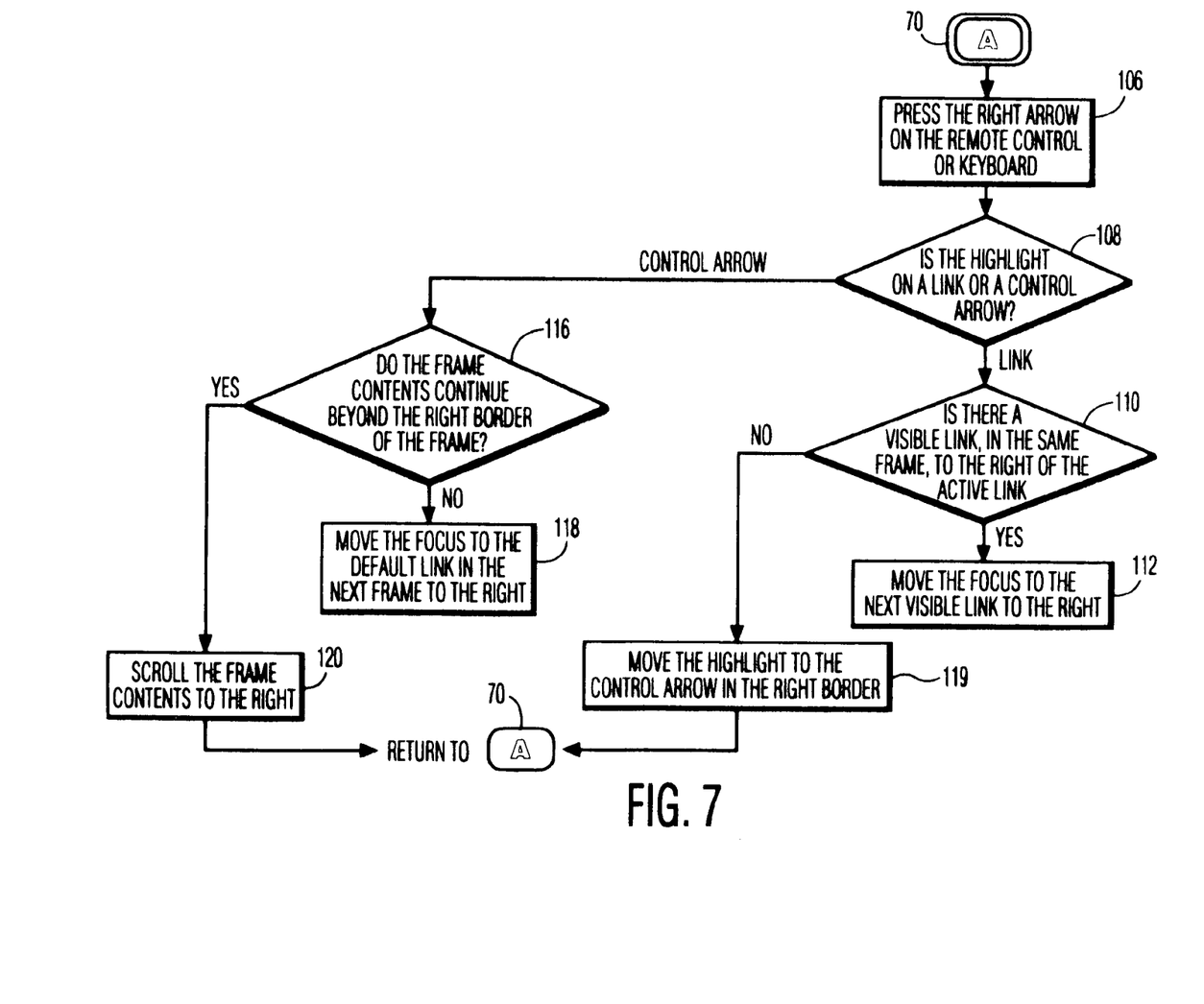
Figure 8:
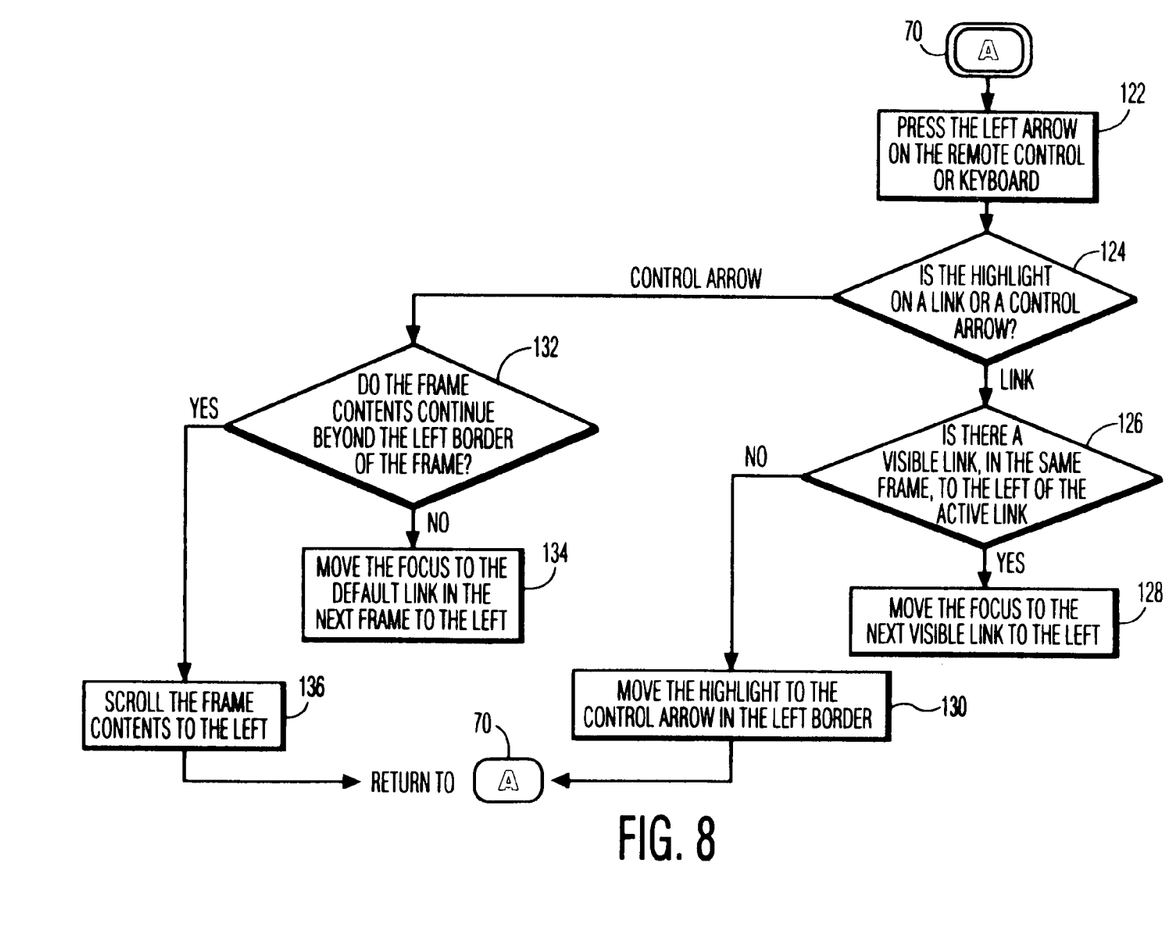

The steps for navigating between the frames and the links within the frames are illustrated in FIGS. 4–8. The steps indicated in FIGS. 4–8 may be implemented using a software routine that, when executed by CPU 26 in FIG. 3, controls the system shown in FIG. 3 to provide the described features. As shown in FIG. 4, the user interface initially draws the frames and shows the control arrows which may be selected. First, the HTML page is loaded in step 40. If the HTML page uses frames and the frames use borders as indicated in steps 42 and 44, the user interface select or gives focus to the frame containing the default link in step 46 then draws the frame borders and frame controls. As indicated in steps 46–50, 52–56, 58–62, and 64–68, the user interface draws a control arrow on the borders which are adjacent to another frame. For example, in FIG. 1, control arrows 12 and 13 are drawn on the right and bottom border portions 15r and 15b, respectively. After drawing the frame borders and frame controls, the user interface waits for and responds to user input as indicated in step 70.

FIGS. 5–8, indicate the steps taken when the user presses the up, down, right and down direction buttons 6–9, respectively, on remote control device 5. As the steps in each of FIGS. 5–8 are similar, only FIG. 6 will be discussed in detail. However, it is to be understood that the discussion below is applicable to the remaining figures.

Figure 1C:
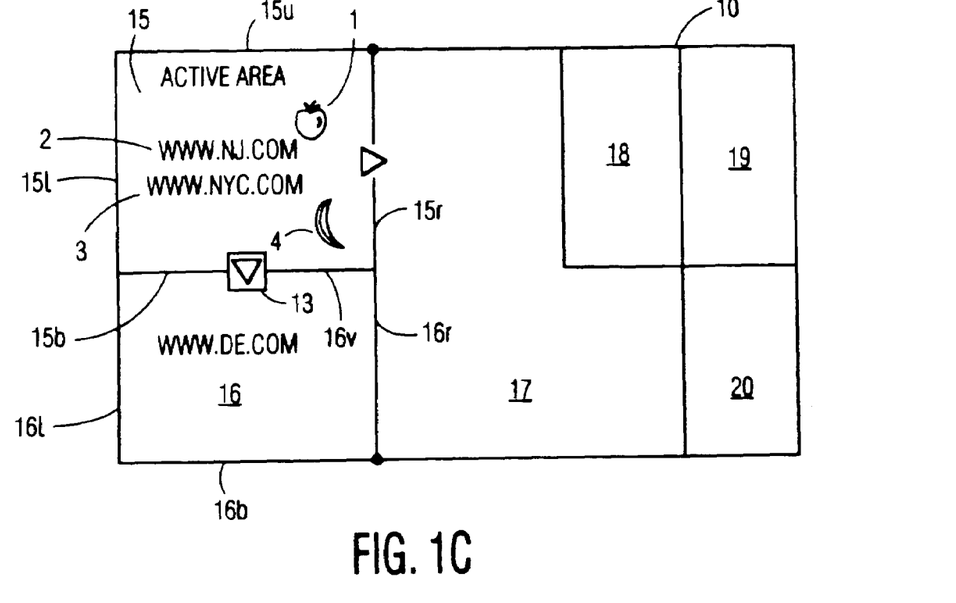

As discussed above, FIG. 1A shows area 15 has been selected to be an active area. When a user then presses down button 7 in step 90 of FIG. 6, the user interface first decides whether the highlight is on a link or on a control arrow as indicated in step 92. If the highlight is on a link, such as icon 3 as shown in FIG. 1A, the user interface must decide whether there is a visible link below the active link 3 inside the active frame 15 as indicated in step 94. If there is a visible link 4, the user interface moves the focus to the link below the active link and highlights that link 4 in step 96, as shown in FIG. 1B. If there is no visible link, the user interface moves the highlight to the control arrow 13 shown in the bottom border 15b and goes back to step 98 to await further user input, as shown in FIG. 1C.

If the highlight is on a control arrow as indicated in step 92, the user interface decides in step 92 whether the frame contents continue beyond the bottom border 15b of the frame 15. If the contents continue but are currently hidden from view of a user, the user interface scrolls the frame to display the contents below the bottom border 15b as indicated in step 109 and then waits for further user input when the down button 7 is released. If the frame contents do not continue, the user interface moves the highlight to the next default, i.e. closest, icon or symbol (link) in frame 16 below the bottom border as indicated in step 102 and as shown in FIG. 2. In this manner, the user can move to a new frame when the contents of frame 15 have been scrolled to an edge. As described above, a user can easily and quickly navigate within and between the frames using the direction and selection buttons on remote control device 5. It is to be understood that the present method may be implemented using a number of techniques and/or programming languages known to one of ordinary skill in the art, including, but not limited to visual BASIC, C++ and JAVA.

It will be apparent to those skilled in the art that although the invention has been described in terms of a specific example, modifications and changes may be made to the disclosed embodiment without departing from the essence of the invention. Therefore, it is to be understood that the present invention is intended to cover all modifications which naturally flow from the foregoing example.

The invention claimed is:

1. A system for navigating within a display having one or more display sections, comprising:
   means for selecting a first section of said display;
   means for navigating within said first section of said display;
   control means for displaying a navigational symbol on a border of said first selected section, said symbol corresponding to a direction in which a highlight may be moved; and
   said control means moves said highlight to a second section of said display in said corresponding direction in response to the steps of highlighting said navigational symbol on said border of said first selected section and selecting said navigational symbol.

2. The system of claim 1 wherein said symbol indicates availability of an adjacent section in said corresponding direction.

3. The system of claim 2 wherein said control means moves said highlight in said corresponding direction to another icon in said adjacent section if no other icon exists in said selected section in said corresponding direction.

4. The system of claim 1 wherein said different sections of the display represent different frames.

5. The system of claim 1 wherein said different sections of the display represent different web pages.

6. The system of claim 1 wherein said control means moves said highlight in said corresponding direction to another icon in said selected section if another icon exists in said selected section in said corresponding direction.

7. A system for navigating within a display having one or more display sections, comprising:
   a user control for selecting a first icon in a selected section of said screen, said user control including a set of directional keys for moving to another icon selection; and
   a controller for determining, in response to an entry of one of said directional keys, whether there is a visible icon in said selected section in the direction corresponding to said entered key; and
   said controller, in response to said determination, moves said highlight to said visible icon if said visible icon is present and moves said highlight to a navigational control, if said visible icon is not present.

8. The system of claim 7 wherein said controller causes said navigational control to be displayed, if an adjacent section is available in a direction indicated by said navigational control.

9. A method for navigating within a display having one or more display sections, comprising:
   selecting a first icon in a selected section of said display via a user control, said user control including a set of directional keys for moving to another icon selection; and
   determining, in response to an entry of one of said directional keys, whether there is a visible icon in said selected section in the direction corresponding to said entered key; and
   moving said highlight, in response to said determination, to said visible icon if said visible icon is present and moving said highlight to a navigational control, if said visible icon is not present.

10. The method of claim 9 wherein said navigational control is only displayed, if an adjacent section is available in a direction indicated by said navigational control.

* * * * *